United States Patent [19]

Doane

[11] 3,970,119

[45] July 20, 1976

[54] METHOD AND APPARATUS FOR MANUFACTURE OF DISPOSABLE THERMOMETERS

[75] Inventor: Frank A. Doane, Syosset, N.Y.

[73] Assignee: Colorflo Leasing Inc., Villa Park, Ill.

[22] Filed: Apr. 19, 1974

[21] Appl. No.: 462,252

[52] U.S. Cl. .............................. 141/1 R; 53/266 R; 141/100; 264/213; 425/129 R
[51] Int. Cl.² ............................................ B65B 3/12
[58] Field of Search ................ 53/37, 266; 141/1, 9, 141/98, 99, 100, 103–105, 237, 238, 242, 275, 284, 325, 351–354, 392, 94; 264/155, 213, 313, 320, 322, 328, 334, 337, 338; 277/DIG. 6; 425/129, 398

[56] References Cited
UNITED STATES PATENTS

| | | | |
|---|---|---|---|
| 3,743,458 | 7/1973 | Hallauer et al. ................ | 425/129 R |
| 3,831,259 | 8/1974 | Goulas ........................... | 277/DIG. 6 |

Primary Examiner—Richard E. Aegerter
Assistant Examiner—Frederick R. Schmidt

[57] ABSTRACT

An apparatus and method for the manufacture of disposable thermometers of the type wherein a temperature responsive substance such as liquid crystal material is supported by a carrier. Reciprocating injectors are used to deliver the liquid crystal material to a die plate which in turn deposits the liquid crystal material on a plurality of thermometer carriers. The path of delivery from the injectors to the die plate is sealed against liquid crystal material leakage while being maintained free from hydrocarbons which might contaminate the liquid-crystal material. In one embodiment distribution pattern of the liquid crystal material to the various thermometers being manufactured is effected through a series of distribution channel grooves cut in the die plate. In a second embodiment the distribution pattern is effected by a series of surgical tube-like members and associated branch tubes which deliver the liquid crystal material from the injectors to the die plate.

9 Claims, 8 Drawing Figures

METHOD AND APPARATUS FOR MANUFACTURE OF DISPOSABLE THERMOMETERS

BACKGROUND OF THE INVENTION

This application relates to the manufacture of disposable thermometers, and more particularly to the manufacture of disposable thermometers in which the change of state of a temperature sensitive substance identifies a temperature range of a test specimen.

More specifically, this application relates to a method and apparatus for manufacturing disposable thermometers wherein liquid crystal material is the temperature sensitive substance.

Disposable thermometers which use liquid crystal material as a temperature sensitive substance are known, per se. An example of such a thermometer is found in U.S. Pat. No. 3,633,425. Economics, however, dictate a need for commercial production of such thermometers.

Applicant has found that certain types of reciprocating injector units, of the type commonly used in connection with die-printing operations, would be suitable for applying the liquid crystal material to the thermometers. This makes production of the thermometers by means of such injector units commercially feasible.

A problem connected with the use of such injector units is the fact that the injector units include parts which contain hydrocarbons which are soluble in liquid crystal material, particularly in the rubber gasket between the injector plate and the die plate. Hydrocarbons tend to contaminate liquid crystal material and render it unsuitable for use in a disposable thermometer. It is therefore essential that injector units which are used to deliver liquid crystal material for use in a disposable thermometer be free of materials in which hydrocarbons or other substances which might tend to contaminate the liquid crystal material are soluble.

THE INVENTION

The present invention solves the foregoing problem by providing a liquid crystal injector unit which is free of parts which include hydrocarbons soluble in liquid crystal material.

In one embodiment of the invention a reciprocating liquid crystal injector unit is adapted with a die plate arrangement for delivering the liquid crystal material to the carrier of each thermometer being manufactured. The specific distribution pattern is determined by a series of distribution channels cut in the die plate in such a manner as to deliver liquid crystal material from one or more injector units to the carrier of each thermometer being manufactured. Liquid crystal material is conducted from the injector units to the distribution channels through fluid passageways in a spacer plate. A material such as teflon, which does not contain hydrocarbons which are soluble in liquid crystal material, is used to seal the junctions of the spacer plate and the die plate, and of the spacer plate and the injector unit, against liquid crystal material leakage.

In a second embodiment of the invention the use of distribution channels in the die plate to determine the distribution pattern is eliminated. Delivery of the liquid crystal material from the injector unit to a die plate which is spaced from the injector units is accomplished by surgical tube-like conduits from the injector units to the die plate, the tubing being free of hydrocarbons which are soluble in liquid crystal material and being suitably secured against leakage to the injector units and to the die plate. The surgical tube-like material is provided with branches which are used to effect the distribution pattern for the liquid crystal material. In this embodiment the die plate simply contains fluid passageways which conduct the liquid crystal material to the thermometer carrier surfaces in the pattern determined by the branches.

Accordingly, it is an object of the present invention to adapt reciprocating injector units for depositing liquid crystal material on a surface, without contaminating the liquid crystal material.

It is a further object to manufacture disposable thermometers containing liquid crystal material, by means of injector units which are free of substances which might tend to contaminate the liquid crystal material.

These, as well as other objects and advantages of the present invention are further disclosed in the following detailed description and drawings in which:

DETAILED DESCRIPTION OF THE INVENTION

Figure 7:
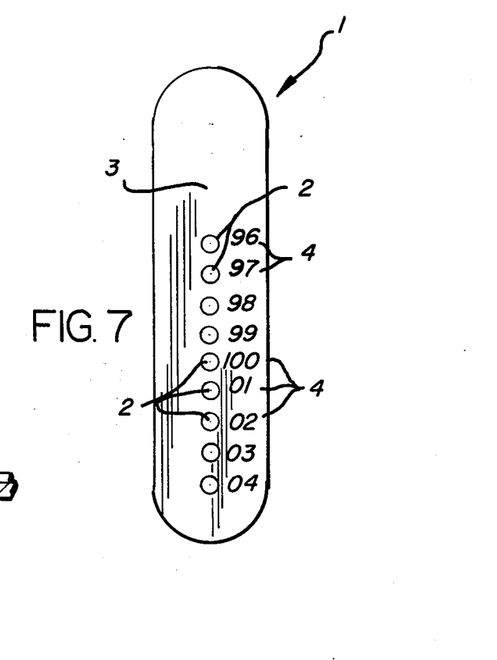
FIG. 7 is a schematic view of a disposable thermometer made in accordance with the present invention.
Figure 8:
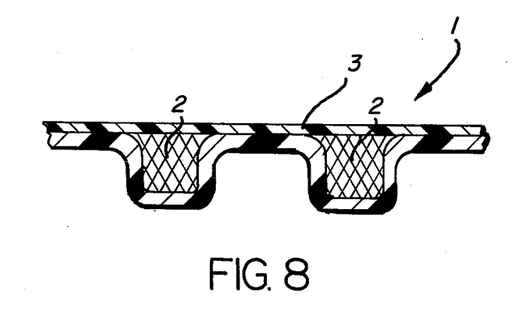
FIG. 8 is a cross-sectional view of the disposable thermometer of FIG. 7.

Referring first to FIGS. 7 and 8, there is shown a disposable thermometer made in accordance with the apparatus and method which are the subject of the present invention. The thermometer consists of a carrier 1 having a plurality of recesses 2 formed therein. Each recess 2 is filled with liquid crystal material, which liquid crystal material will change state at a specific specimen temperature range. The temperature range of the liquid crystal material in each of the recesses of the thermometer of FIGS. 7 and 8 will be different, and will be visually indicated next to the appropriate recess. Thus the thermometer of FIGS. 7 and 8 may be designed to visually display the temperature of a speciment over a desired temperature range, if the liquid crystal material is chosen so that the temperature ranges covered by the individual recesses span the entire desired temperature range.

In the preferred embodiment of applicant's invention the liquid crystal material is of a known type which turns invisible at a specific temperature range. In reading a thermometer of this type it is merely necessary to note the temperature range of the last recess whose liquid crystal material has turned invisible.

Liquid crystal material of this type is desirable for use in disposable thermometers because while the liquid crystal material changes state over a specific temperature range, the material does not remain in its changed state over a long period when the thermometer is removed from the temperature source. In fact, the liquid crystal material which is preferred tends to return to its original state within approximately 5 minutes after it is removed from the temperature source which caused the original change of state. This, of course, enables thermometers using liquid crystal material to be transported to various destinations under conditions in which they may be subjected to temperatures which might cause some or all of the liquid crystal material to change state. Removal of the temperature source which tends to cause the change of state enables the liquid crystal material to return to its original state after a relatively short period of time, thus readying the thermometer for subsequent use.

In the manufacture of the thermometer a carrier such as 1 in FIGS. 7 and 8 is provided with recesses 2. A carrier which is suitable for the purposes of this invention may preferably be made of Mylar. The recesses 2 are filled with liquid crystal material, and the carrier 1 carrying the recesses is then covered with a transparent protective cover 3. The transparent cover 3 seals the liquid crystal material within the recesses 2, while also permitting the state of the liquid crystal material to be viewed therethrough. Appropriate markings which delineate the change in state temperature range of the liquid crystal material in a particular recess may be placed on the transparent cover. Or such markings may be placed on the Mylar carrier prior to the application of the transparent cover, through which they may, of course, be viewed.

Economic considerations necessitate that such thermometers be produced in a manner which is commercially feasible. It is desirable to produce a number of thermometers during a single operation, and applicant has found that injecting units such as the type that are presently employed in printing related operations for applying different colored fluids to a surface can be advantageously used to deposit liquid crystal material onto a plurality of thermometer carriers. The injectors are of the general type found in U.S. patent application Ser. No. 168,990 filed Aug. 4, 1971 by Harold F. Farrow, now U.S. Pat. No. 3,896,722.

Figure 1:
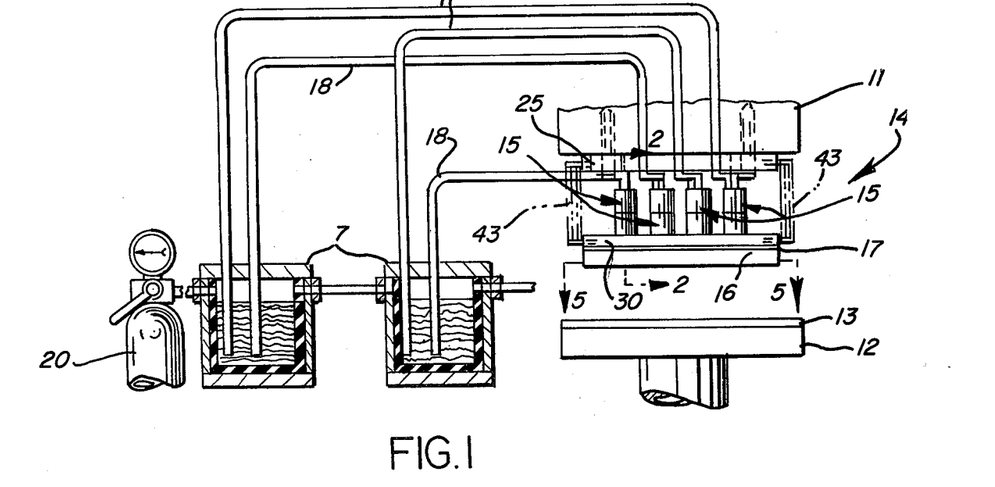
FIG. 1 is a schematic view illustrating an injector unit embodying the present invention.

As shown in FIG. 1, the injection unit is illustrated and includes an upper reciprocating member 11, and a base or anvil member 12 on which the carriers 1 which are to receive the liquid crystal material are positioned. The base 12 contains a number of recesses for receiving the recesses of the carrier material. Base 12 is also coated with a rubber layer 13 which also carries suitable recesses which interfit with the recesses carried by base 12. Of course, it is readily obvious that the base, the rubber layer, and their respective recesses are so designed that the base can support a plurality of thermometer carriers.

Reciprocating member 11 carries the unit generally designated 14 which embodies the present invention. Unit 14 in general includes a plurality of fluid injector units 15, a die plate 16 while deposits the liquid crystal material on the carriers, and a spacer plate 17 interposed between the die plate 16 and the injector units 15.

Figure 5:
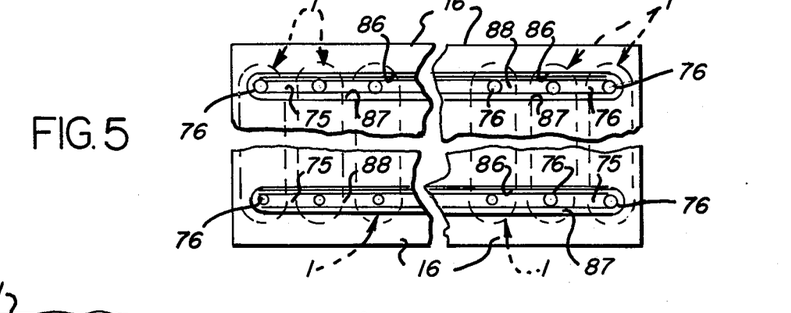
FIG. 5 is a top view of a die plate in accordance with the present invention.

A top view of the die plate is depicted in FIG. 5. For the purposes of illustration, there is shown, in broken lines, the outlines of a number of carriers, each of which is to constitute a separate thermometer, and each of which are to have liquid crystal material deposited therein in accordance with the present invention. Channel grooves 75 in the upper surface of the die plate 16 receive fluid from injector units 15 through fluid passageways 74 in the spacer plate. The fluid distribution channel grooves 75 deliver the liquid crystal material to fluid openings 76 which in turn deliver the liquid crystal material to the recesses of the respective thermometer carriers.

In the llustration of FIG. 5, six carriers 1 are shown, and, for the sake of simplicity, it will be assumed that each carrier is to have two recesses, each of which is to contain liquid crystal material with a different change-of-state temperature range. Thus, two different types of liquid crystal material will be used, and in the example of FIG. 5 a different type of liquid crystal material will be delivered to each channel groove 75. The liquid crystal material will be delivered through one or more injector units 15 (and, of course, the respective fluid passageway 74 associated therewith). The liquid crystal material is delivered to each channel groove 75 and, through fluid openings 76, to a respective recess of each carrier 1.

While the die plate of FIG. 5 is shown as adapted to deliver liquid crystal material to six carriers, it will be readily obvious to those of ordinary skill in the art that the die plate may be cut with channel grooves which will deliver the liquid crystal material to many more recesses of many more carriers, depending, of course, upon the number of thermometers to be manufactured by one injection cycle of the injector units, as well as the number of recesses each thermometer is to contain. The fluid distribution channel grooves of the die plate will be so contoured that liquid crystal material from a single source which is communicated to the die plate through a single injector may be subsequently delivered through the die plate to a respective recess of each thermometer carrier supported on said base.

As seen in FIG. 1, the liquid crystal injectors 15 are each connected with a source 7 of liquid crystal material for deposit on the carrier surface 1. The liquid crystal sources 7 are connected with the individual injectors units 15 by suitable flexible conduits 18. The liquid crystal sources 7 will contain different types of liquid crystal material which will be simultaneously deposited on each of the carriers 1 as will be further apparent from the description hereinbelow.

Each of the liquid crystal material sources 7 may be connected with individual material injector units or a single source may be connected with a plurality of injector units. Each of the liquid crystal material sources 7 is connected with a supply of a suitable gas 20 such as nitrogen which provides a pressure atmosphere above the supply fluid in the source and thereby functions to aid in directing or forcing the liquid crystal material in sources 7 into the injector unnit 15 as will be apparent from the description which follows.

Figure 3:
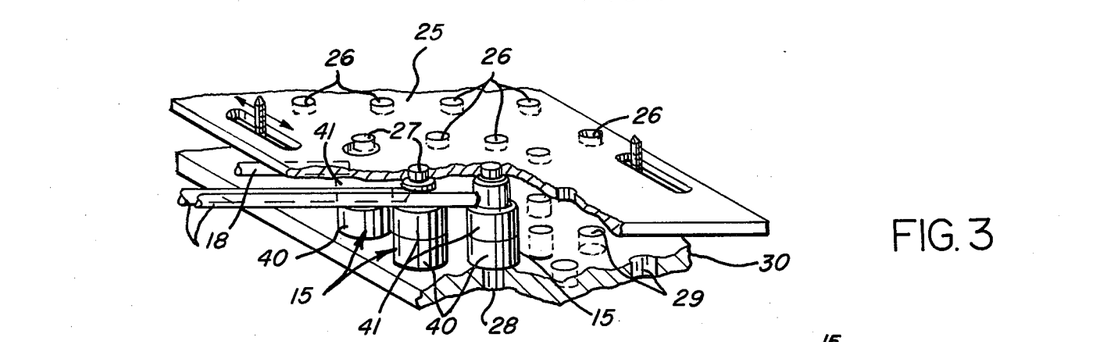
FIG. 3 is a somewhat schematic perspective view illustrating the specific mounting of the injector units.

As seen in FIG. 3, the unit 14 includes a plate 25 having a plurality of openings 26. The openings 26 and the plate 25 are adapted to receive an upper pilot portion 27 of each of the injector units 15. Each injector unit 15 also has a lower pilot portion 28 which is adapted to be positioned in an opening 29 in the plate 30. Each opening 29 in the plate 30 aligns with a respective opening 26 in the plate 25.

The plate 30 as well as the plate 25 may have any arrangement of openings desired therein for purposes of mounting individual injector units 15 therebetween as may be dictated by the particular job being performed. Moreover, dummy injector units, that is injector units which are not connected with a liquid crystal supply 7 may be positioned in these openings as well.

The plate 25 is constructed so as to be readily secured to the reciprocating member 11. The plate 25 may be secured by any suitable means to the reciprocating plate 11. Preferably, a means which allows for adjustment of the plate relative to the reciprocating member 11 is provided. In this manner proper registry of the unit 14 relative to the reciprocating member 11 and relative to the carrier 1 can be effected. In FIG. 3 of the drawings suitable screws which extend into slots in the plate 25 may be provided for this purpose. Upon loosening the screws the unit 14 can be moved relative thereto for registry purposes, the slots being large enough to accommodate such movement.

Figure 4:
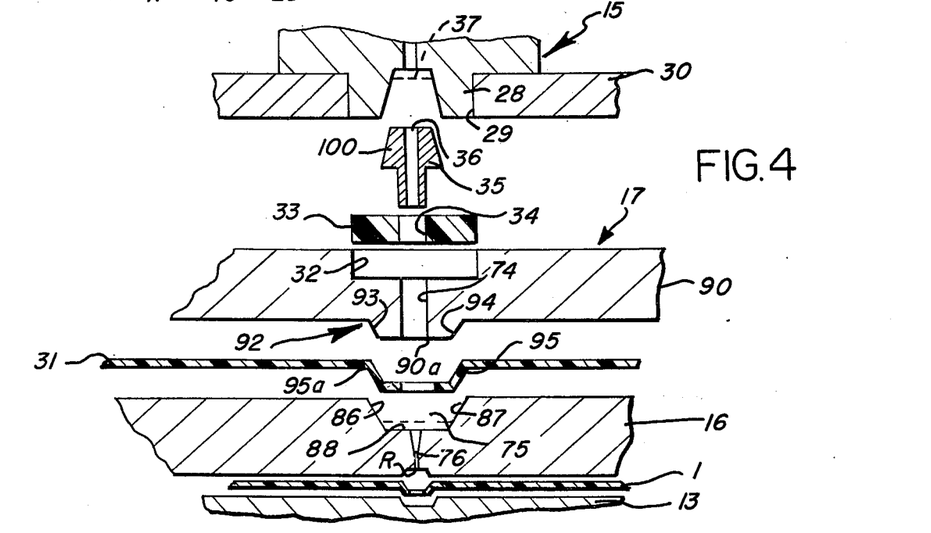
FIG. 4 is a somewhat schematic view illustrating the manner of adapting an injector unit for liquid crystal handling in accordance with the present invention.

The plate 30 is constructed so that the die plate 16 and the spacer plate 17 may be readily attached thereto. The specific formation of the plate 30 spacer plate 17 and the die plate 16 is an important feature of the present invention and is shown in FIG. 4. Spacer plate 17 and die plate 16 have a thin teflon sheet inserted between them. The three members are subjected to pressure which tends to deform the cross-sectional thickness of the teflon and depress it into the distribution channel grooves 75 formed in the die plate. Screws are then inserted in appropriate bores and are drawn tight to hold the plates together. Injector holes are then pierced in the teflon.

spacer plate 17 is constructed with a fluid passageway therethrough. The fluid passageway includes a long narrow portion 74 at the bottom of the plate which communicates with the distribution channel grooves 75 in the die plate, and a recess 32 being of a larger dimension for reception of a teflon plug 33 therein. The teflon plug 33 carries a central hole 34 which itself receives a brass plug 35 the bottom part of which extends through the hole in the teflon plug and the upper part of which inserts in a lower pilot portion 28 of a respective injector unit 15. The brass plug 35 also includes a fluid passageway 36. It should be noted that when the die plate is connected to the injector unit the upper surface of the brass plug stops short of the lower surface 37 of the injector channel.

The fluid passageway in the brass plug, the injector holes in the teflon sheet, the fluid passageway in the spacer plate all are aligned with the fluid passageway from the injector unit and with the distribution channel groove in the die plate, and thereby designed to deliver the crystal liquid material from the injector units into the distribution channel grooves 75 of the die plate.

When the injection unit and the die plate are thus assembled, the injection unit formed thereby is ready for application of the liquid crystal material to the respective carriers which are to form the disposable thermometers. Once the injection unit is assembled and the die plate connected thereto the injection process which delivers the liquid crystal material to the die plate and hence to respective thermometer carriers is carried out in much the same manner as the injection process disclosed in the forementioned Farrow application Ser. No. 168,990. The salient points of the injection process will be set forth hereinafter.

Figure 2:
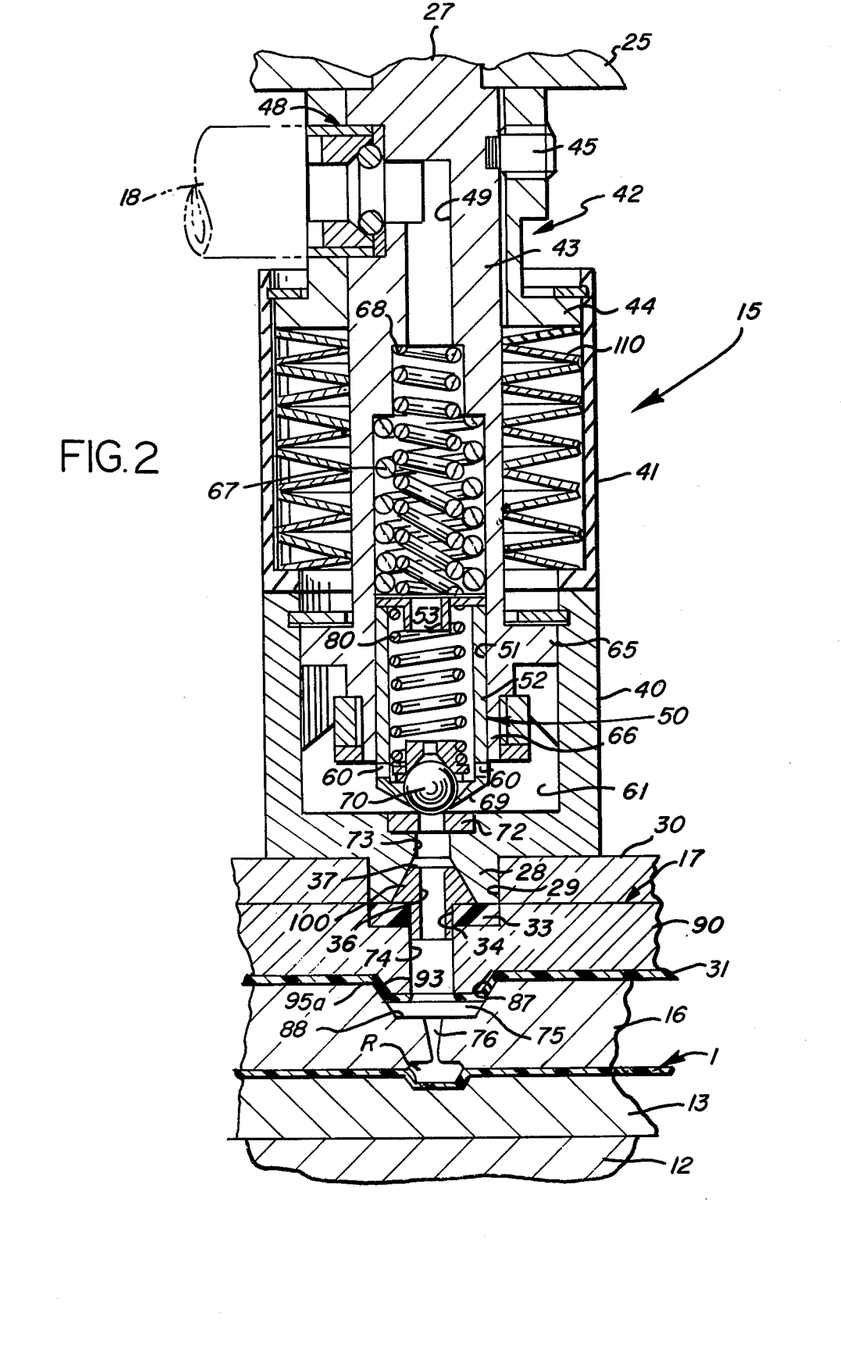
FIG. 2 is a cross-sectional view of a single fluid injector unit in accordance with the present invention.

Insofar as the present invention is concerned, the fluid injector units 15 may take a variety of different structural forms. Referring specifically to FIG. 2, the fluid injector unit 15 includes a housing formed of two parts 40 and 41 which are mounted in a stacked relation to each other. The housing part 40 includes the pilot portion 28 which extends into the opening 29 in the plate 30. A piston assembly, generally designated 42 in FIG. 2 projects into the housing defined by the housing parts 40, 41. The piston assembly 42 includes a main piston member 43 and a second piston member 44 which are suitably secured together by suitable means in the form of a setscrew 45. The main piston member 43 has the pilot portion 27 thereon which projects into the opening in the plate 25. It should be apparent, of course, that upon reciprocating movement of the member 11 of the injector unit, the member 11 will apply a force to the piston members 42, 43 to effect movement thereof.

As noted above, the liquid crystal material supply 7 is connected by the conduit 18 to the injector unit 15. The conduit 18, as shown in FIG. 2, communicates through a suitable connection, generally designated 48, with a passageway 49 located in the piston member 43. The passageway 49 extends longitudinally of the piston member and contains at its outer end, or lower end, as shown in FIG. 2, a reciprocating piston unit 50 which is reciprocable in the bore 51 in which it is contained piston unit 50 is a hollow structure and includes a cylinder member 52 which is received in the bore 51 and is slidable therein. The cylinder member 52 at its upper end has an opening 53 therein which communicates with the liquid crystal material supply. Accordingly, it should be apparent that the liquid crystal material can flow from the conduit 18, as shown in FIG. 2, through the connector 48 and into the passageway 49 and through the opening 53 and into the hollow piston member 52.

With the injector unit 15 in the position illustrated in FIG. 2, in which the members 11, 12 are out of contact, and the member 11 is in its upper position, the fluid which flows into the hollow cylinder member 52 may flow therefrom through suitable openings 60 in the lower end of the member 52 and into an outlet chamber 61 as defined in part by the housing member 40. When the injector member 11 moves downwardly, the entire unit 14 is carried with that member 11 and the die plate 16 engages the carrier surface 9 and effects a seal therewith. The seal is effected primarily in the areas surrounding the recess R formed in the die plate 16 and the recess 2 in the carrier surface. Further downward movement after the seal is effected of the member 11, effects movement of the piston assembly 42 downwardly relative to the housing members 40, 41 and relative to the die plate 16. This downward movement results in the lower end of the piston, designated 65, moving into the chamber 61. Initial movement of the piston 65 causes a portion 66 thereof to slide over the openings 60 in the member 52 and thereby effect the closing of the openings 60. This structure, in effect, comprises a slide inlet valve for the chamber 61.

Once the openings 60 have been closed, the chamber 61 then becomes a closed fluid chamber having a specific charge of a predetermined amount of fluid therein. This is due to the fact that the piston 65 is located a predetermined distance from the end wall of lower wall of the member 40 which defines chamber 61 when the openings 60 are closed thereby. Further movement of the lower end 65 of the piston then increases the pressure of the fluid in the chamber 61. As the pressure of the fluid in the chamber 61 increases, that pressure acts on a conical surface 69 on the lower end of the member 52. The fluid pressure will increase sufficiently so as to cause a retracting movement, that is, a movement of the member 52 into the piston against the bias of the springs 67 and 68 contained in the piston. As a result, the ball valve member 70 moves away from its seat 72 so that fluid is then ejected from the chamber 61 and through outlet openings 73 in the housing member 40.

The fluid which flows from the opening 73 flows into a passageway 36 in brass plug 35. From the passageway 36 the fluid flows into passageway 74 in the spacer plate 17 and from passageway 74 into fluid distribution channel 75 formed in the back side of the die plate 16. As set forth heretofore, the fluid distribution channel 75 has a plurality of openings 76 therein which communicate with the die recess R formed in the face of the die plate 16. Accordingly, it should be apparent that upon each reciprocation of the member 11, fluid is forced from the supply chamber 61 into the recess R in the die plate 16.

In the event that the pressure in the recess R becomes too great, which may cause leakage of fluid between the die plate 16 and the carrier surface, or between the spacer plate 17 and the die plate, the fluid injector unit 15 is provided with a pressure release or limiting system. The pressure release system consists of the ball valve 70 which is biased against the lower portion of the member 52 by a spring 80. In the event that the pressure in the system increases above that determined by the spring 80, the ball valve 70 will move away from the lower end of the member 52 and provide for a venting of the pressure, or a release of the pressure to the interior of the piston member 43, thereby, in effect, decreasing or limiting the pressure that is provided in the recess R.

Each of the distribution channels 75, as illustrated in FIGS. 2 and 5, has a plurality of fluid openings 76 which communicate with the recesses R formed in the opposite side or on the face side of the die plate 16. The openings 76 direct fluid from each of the fluid distribution channels 75 into the recesses R formed on the front face of the die plate 16.

Each fluid distribution channel 75 is generally wedge shaped in configuration, as best illustrated in FIGS. 2 and 4, and is defined by surfaces 86 and 87 which converge as they extend from the back side of the die plate toward the front side of the die plate. The converging surfaces 86, 87 terminate at and are connected by a bottom surface 88 which is substantially horizontal. The openings 76 which communicate the distribution channel 75 with the recesses R are formed in the bottom surface 88 of the distribution channel.

The combined spacer plate 17 and teflon sheet 31 are constructed so as to provide a sealing engagement with the surfaces 86, 87 which define the fluid distribution channels 75 in the die plate, and are also constructed so as to provide a fluid-tight seal with the housing member 40 of each injector unit 15. The spacer plate comprises a substantially plate-like member which has a main body portion 90 which is interposed between the plate 30 and the die plate 16.

The spacer plate 17 additionally has ribs thereon, generally designated 92 and best shown in FIGS. 2 and 4. The ribs 92 are formed in the same configuration as the distribution channels 75 in the die plate 16 and are adapted to be positioned within the distribution channels in the die plate 16. Accordingly, the ribs 92 are defined by converging surfaces 93, 94 and which converge as they extend from the main body of the spacer plate 17. When the die plate, the spacer plate and the teflon sheet have been assembled and subjected to pressure, as set forth above, the teflonn sheet will de-
form to define ribs 95 which are contoured the same as ribs 92. The ribs 95a and the surfaces 93, 94 converge at substantially the same angle as the surfaces 86, 87 converge and, accordingly, the surfaces 93, 94 press ribs 95 against the surfaces 86, 87. The ribs 92 which are formed on the spacer plate and the teflon ribs 95 have end surfaces 92a and 95a, respectively, which terminate short of the bottom surface 88, and as a result the fluid distribution channel 75, as illustrated in FIG. 2, is defined by the surface 88 and the end surface 95a of the teflon ribs 95, as well as by the lower portions of surfaces 86, 87.

As noted hereinabove, each injector unit 15 may communicate with each distribution channel or a plurality of injector units may communicate with a given distributionn channel. As illustrated in FIG. 2, the spacer plate 17 and die plate 16, as well as the fluid injector unit 15, are illustrated in their up position, or prior to movement into engagement with the carrier surface 1 on which the fluid is to be deposited. As the member 11 moves downwardly, the die plate 16 engages the carrier and provides a seal therebetween. The first action which occurs after movement of the die plate into engagement with the material is the disappearannce of the gap 91. Spacer plate ribs 92 help to provide a solid reinforcement for the die plate 16 in the area of the recess formed therein, and thus tend to minimize wear of the die plate and provides for a longer life die plate.

Continual downward movement of the member 11 effects movement of the piston member 43 so as to eject the charge of liquid crystal material from the chamber 61, as described hereinabove. This movement causes fluid to flow through the opening 36 in the brass plug, through the fluid passageway 74 in spacer plate 17, into the fluid distribution channel 75 and into the recess of the carrier 1.

On withdrawal of the member 11 and the die plate 16 therewith from the carrier 1 which received the liquid crystal material, the die plate 16 and spacer plate 17 are returned to the positions which are illustrated in FIG. 2.

It should be apparent from the above description that the spacer plate 17 and the teflon sheet 31 perform a substantial sealing function in preventing contamination or communication of one fluid distribution channel 75 in the die plate 16 with another. This seal is provided by the fluid-tight sealing contact between the surfaces 93, 94 of the rib 92, the surfaces 86, 87 defining the fluid distribution channel in the plate 16, and the deformed portions 95 of the teflon sheet 31. Moreover, it should be apparent that this sealing pressure between the surfaces increases when the piston 43 in the fluid injector unit 15 is forcing fluid into the fluid distribution channel, so that the surfaces are not continuously under a high pressure sealing contact, but rather have the greatest sealing pressure at the appropriate time.

In addition to the above, the brass plug 35 has a tip or projection thereon, generally designated 100. The projection 100 is conical in form and has the opening 36 extending therethrough. The projection 100 extends into a conically-shaped recess in the pilot portion 28 of the housing member 40. The conical surfaces of the recess in the member 40 and the conical-shaped projection 100 effect a fluid-tight seal therebetween. Such structure is best illustrated in FIG. 2. The teflon plug, the conical-shaped formation 100 and the recess 28 provide an effective seal between the spacer plate 17 and the housing portion of the injector unit 15. In this manner appropriate seals are provided in an effective manner between the die plate and the fluid injector units 15, and appropriate seals are provided in order to prevent intermingling of different types of liquid crystal material being deposited on the carriers.

In use, the injector units 15 are preassembled between the plates 25 and 30 while the plates are off the member 11. The plates 25, 30 are provided with the plurality of pairs of aligned holes which are adapted to receive the portions 27, 28 of the injector units, and a set of plates 25, 30 will accommodate a predetermined maximum number of injector units. The die plate, spacer plate, teflon sheet are then formed as set forth heretofore, the teflon plug 33 and brass plug 35 are assembled and inserted in recess 32 and pilot portion 28, respectively, and the spacer plate is attached to plate 25.

If an injector unit is not required in a particular location corresponding to a pair of aligned holes, a dummy injector unit is preferably utilized in its place, that is, a unit without a fluid connection but with loading springs for establishing the necessary fluid delivering pressure and sealing pressure for the spacer plate 17 is utilized, before the pistons of the injector units move in their injection strokes.

Referring to FIG. 2, it will be noted that the piston 44 is moved downwardly against the operation of a plurality of Bellville washers 110 surrounding the member 43 of the main piston which acts as loading springs for establishing pressure. The dummy injection units may merely comprise a piston-cylinder arrangement having springs which correspond to the Bellville washer type springs 110 and may be a fluid injection unit not connected to a liquid crystal material supply. The use of either a dummy unit or an injector unit at each pair of openings assures that a uniform downward pressure is applied to the plate 30 and, in turn, from the plate 30 to the spacer plate 17 and the die plate 16.

Figure 6:
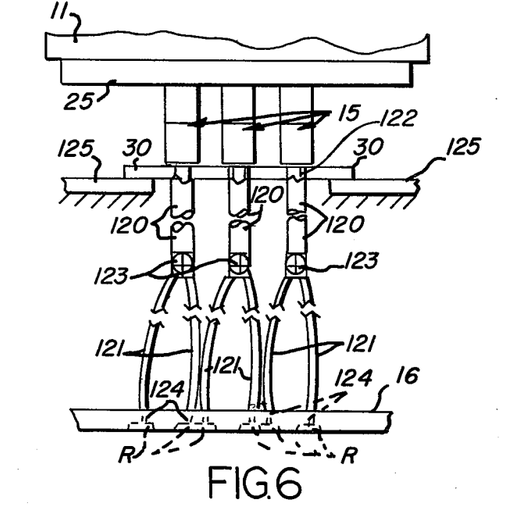
FIG. 6 is a schematic view illustrating a modified form of injector unit in accordance with the present invention.

In a modified form of the invention, shown in FIG. 6, the spacer plate is eliminated and the need for distribution grooves in the die plate to effect a specific distribution pattern is also eliminated. The injector delivers the liquid crystal material into appropriate surgical tube-like members, one of which is illustrated at 120 in FIG. 6. These tube-like members 120 lead from their respective injectors 15 and form a plurality of branches 121 each branch associated with a recess of a respective thermometer carrier surface.

As shown in FIG. 6, the injector units 15, which are shown schematically, and plate 30 are similar in construction to those shown in FIGS. 1-3. Fluid delivery members 122 extend outwardly from plate 30, and surgical tube-like conduits 120 extend therefrom. Conduits 120 are, in the preferred embodiment, made of polyethylene which does not contain hydrocarbons which are soluble in liquid crystal material, and are connected to the members 122 by a suitable heating process which melts the polyethylene and allows it to surround and to conform to the shape of the members 122. Of course, it will be readily obvious that other connecting means, mechanical clamps for example, may also be used to connect the conduits to members 122.

The distribution pattern for the liquid crystal material delivered to the carriers is effected through a series of branch tubes 121. These branch tubes communicate with conduit 120 as shown, through a manifold-type member 123 as shown in FIG. 6. Of course, the connection of conduit 120 to member 123, and of 123 to branches 121 will be made through suitable melting of the polyethylene to effect liquid-tight seals. It should be further noted that the fluid passageways 124 in the die plate may have raised portions 126 (not shown) to permit tubing 121 to surround them, and to be suitably melted to effect a fluid-tight seal therewith.

In this embodiment the die plate 16 communicates with the branch tubes 121. However, as seen in FIG. 6, the die plate in this arrangement simply acts as a conduit to pass the liquid crystal material delivered from a single branch tube directly to a respective recess of the carrier surface. Thus, it is not necessary that the die plate be cut in any form of distribution pattern with channel distribution grooves since the distribution pattern is determined by the number of branch tubes and the die plate need only contain fluid passageways 124 for the liquid crystal material.

The die plate 16 may either be connected to the same structure 11 which reciprocates the injector unit 15 or may have its own reciprocating actuator means. The only essential feature being necessary is that the die plate be adapted to reciprocate along with the injector units 15.

Of course, it is desirable for the injector units to function in a manner similar to those shown in FIGS. 1-3, to the extent that injection of the liquid crystal material is effected by a fluid delivering pressure against the injector unit. The combined die plate and spacer plate applies such a pressure in the previous embodiment. The fluid delivering pressure is applied in the present embodiment by means of stationary anvil plates 125. These plates are connected to plate 30 as shown in FIG. 6 and as the injector units are reciprocating tend to apply similar pressures to plate 30 as were applied in the previous embodiment. Thus, the injection of the fluid into the distribution conduits will be effected in the same way as in the previous embodiment.

It should be noted that the second embodiment involves the passage of fluid through narrow tube-like conduits. The surface tension, or capillary action between the fluid and the conduit walls prevent the fluid from flowing from the tubes when the injectors are not activated. Such surface tension will in fact impede fluid passage to a degree, until the tubing members have been substantially filled with liquid crystal material. Further operation of the injector units will then cause the desired amount of liquid crystal material to be delivered from the conduits to their respective carriers.

It will be readily apparent that in this form of the invention the number of thermometers which can be produced during a single injection cycle of the injector units is determined by the number of branches which may be conveniently attached to the various tubing members and adapted to deliver fluid to the die plate without undue interference with other branches.

Similarly, while applicant has found that polyethylene is a suitable material for the surgical tubing, it will be readily obvious to those of ordinary skill in the art that numerous other materials may be suitable to form the surgical-like tubing, so long as such materials are free of hydrocarbons which are soluble in liquid crystal material.

With the foregoing specification in mind, many and varied modifications will become readily obvious to those of ordinary skill in the art. Therefore, the genesis of what applicant considers his invention is found in the following claims.

I claim:

1. Apparatus for the manufacture of disposable thermometers wherein a thermometer comprises a carrier for receiving temperature responsive liquid crystal material, said apparatus comprising a base for supporting a plurality of carriers, storage means for storing liquid crystal material, a plurality of reciprocating injector means in fluid communication with said means for storing liquid crystal material, delivery means comprising a die plate connected to each of the plurality of reciprocating injector means for receiving liquid crystal material from said plurality of injector means and for depositing said liquid crystal material on selected ones of the carriers, means associated with each selected carrier for providing a visual indication of the temperature range in which a deposit of liquid crystal material on the carrier will change state, a spacer plate disposed between said plurality of injector means and a first side of said die plate, each of said injector means including an outlet passage, said die plate including a plurality of fluid passages extending therethrough, fluid passages in said spacer plate communicating with said outlet passage of said injector means and said fluid passages, in said die plate, means for simultaneously reciprocating said plurality of injector means so that the die plate reciprocates simultaneously with said injector means, means for substantially sealing the delivery means against leakage of liquid crystal material and for maintaining the liquid crystal material out of contact with hydrocarbons which are soluble in liquid crystal material comprising a sheet of Teflon disposed between said die plate and said spacer plate, the Teflon sheet being deformable by reciprocation of the injector means to fit portions of the contour of the first side of said die plate, fluid passages formed in said Teflon sheet in substantial alignment with the fluid passages in said spacer plate, the fluid passages allowing liquid crystal material to pass from the injector means to said first side of said die plate and the Teflon sheet sealing the junction of the first side of the die plate and the spacer plate against liquid crystal material leakage while maintaining the liquid crystal material out of contact with hydrocarbons which are soluble in liquid crystal material.

2. Apparatus as set forth in claim 1, wherein each of the fluid passages in said spacer plate includes an axially extending bore having a Teflon plug disposed in an end thereof, said Teflon plug including an axial extending bore, a brass plug having a first end disposed in said axial bore in said Teflon plug and having a second disposed end in a close fitting relationship with a correspondingly shaped channel in a respective one of said injector means, said brass plug including a fluid passageway which communicates with both an injector means and with a fluid passage in said spacer plate, the Teflon plug and the close fitting relationship between the upper end of said brass plug and said channel being effective to seal the junction of said spacer plate and said injector means against liquid crystal material leakage while maintaining the liquid crystal material out of contact with hydrocarbons which are soluble in liquid crystal material.

3. Apparatus as set forth in claim 2, wherein said base includes means defining a plurality of carrier support surfaces, each of which is designed to support a carrier, each carrier being associated with a different disposable thermometer, said die plate having a plurality of distribution grooves formed therein, each distribution groove being aligned with an outlet passage of a respective injector means, each distribution groove defining means for delivering liquid crystal material from a respective injector means to each of the carriers supported by the carrier support surfaces in said base.

4. Apparatus as set forth in claim 3, wherein each carrier includes a plurality of recesses for receiving the liquid crystal material, each of said carrier support surfaces including a plurality of recesses, the recesses in a carrier being dimensioned such that they interfit with the respective recesses in a respective carrier support surface, and wherein said delivery means is adapted to deposit the liquid crystal material in the recesses of said carriers.

5. Apparatus for the manufacture of disposable thermometers wherein a thermometer comprises a carrier for receiving temperature responsive liquid crystal material, said apparatus comprising a base for supporting a plurality of carriers, a plurality of storage means for storing different types of liquid crystal material, a plurality of reciprocable injector means each in fluid communication with a storage means for storing one type of liquid crystal material, means for simultaneously reciprocating said plurality of injector means and for ejecting liquid crystal material from said plurality of injector means, a die plate spaced from said plurality of injector means, said die plate including a plurality of fluid distribution channels extending therethrough, said die plate being disposed with its fluid distribution channels aligned with selected ones of the carriers supported on said base, each fluid distribution groove being adapted to deposit liquid crystal material at a single location on a selected carrier, a tubular distribution member associated with each of said injector means and with a selected plurality of the fluid distribution channels in said die plate for receiving the liquid crystal material ejected from each injector means and for delivering the liquid crystal material to the selected plurality of the fluid distribution channels in said die plate, the tubular members directing liquid crystal material from the injector means to the selected plurality of fluid distribution channels in the die plate while maintaining the liquid crystal material out of contact with hydrocarbons which are soluble in liquid crystal material, and means associated with each elected carrier for providing a visual indication of the temperature range in which a deposit of liquid crystal material will change state.

6. Apparatus as set forth in claim 5 wherein the tubular member associated with each injector means includes a plurality of integral branches, said branches being adapted to deliver the liquid crystal material from an injector means to a selected plurality of fluid passageways in said die plate and thereby to a respective recess of a carrier of each thermometer.

7. Apparatus as set forth in claim 6, wherein said tubular members and said integral branches are formed of polyethylene.

8. A method of manufacturing disposable thermometers of the type wherein the thermometer comprises a carrier having deposits of temperature responsive liquid crystal material thereon, comprising the steps of supporting a plurality of carriers on a base, conducting liquid crystal material into a plurality of injectors, each of which includes means for forcing liquid crystal material therefrom, simultaneously forcing liquid crystal material from selected ones of the injectors, depositing the liquid crystal material which is forced from the selected injectors onto selected ones of the carriers, and providing each of the selected carriers with means for providing a visual indication of the temperature range in which each deposit of liquid crystal material will change state.

9. A method as set forth in claim 8 wherein the step of depositing the liquid crystal material onto selected ones of the carriers includes the step of depositing liquid crystal material forced from each injector onto each of the selected ones of the carriers.

* * * * *